United States Patent
Asano

(10) Patent No.: US 9,694,458 B2
(45) Date of Patent: Jul. 4, 2017

(54) INTERIOR CLEANING DEVICE FOR MACHINE TOOL, AND CLEANING PIPE USED BY INTERIOR CLEANING DEVICE FOR MACHINE TOOL

(71) Applicant: FANUC CORPORATION, Yamanashi (JP)

(72) Inventor: Keita Asano, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 58 days.

(21) Appl. No.: 14/711,097

(22) Filed: May 13, 2015

(65) Prior Publication Data

US 2015/0328667 A1  Nov. 19, 2015

(30) Foreign Application Priority Data

May 16, 2014 (JP) ................................. 2014-101871

(51) Int. Cl.
*B08B 9/00* (2006.01)
*B23Q 11/00* (2006.01)

(52) U.S. Cl.
CPC ............. *B23Q 11/005* (2013.01); *B08B 9/00* (2013.01); *Y02P 70/171* (2015.11)

(58) Field of Classification Search
None
See application file for complete search history.

(56) References Cited

U.S. PATENT DOCUMENTS

2013/0152981 A1* 6/2013 Bertsch ............... A47L 15/0013
134/105

2013/0174878 A1   7/2013 Seo et al.
2013/0233355 A1* 9/2013 Alpert ................... A47K 10/48
134/30

FOREIGN PATENT DOCUMENTS

| JP | 7-297162 A | 11/1995 |
|---|---|---|
| JP | 2003-25180 A | 1/2003 |
| JP | 2005-336582 A | 12/2005 |
| JP | 2006-341353 A | 12/2006 |
| JP | 2008-80464 A | 4/2008 |
| JP | 2008-110412 A | 5/2008 |
| JP | 2013-244555 A | 12/2013 |
| JP | 2015-85403 A | 5/2015 |
| KR | 10-2010-0058999 A | 6/2010 |

OTHER PUBLICATIONS

Office Action mailed Sep. 8, 2015, corresponding to Japanese Patent Application No. 2014-101871.

* cited by examiner

*Primary Examiner* — Michael Barr
*Assistant Examiner* — Cristi Tate-Sims
(74) *Attorney, Agent, or Firm* — Hauptman Ham, LLP

(57) ABSTRACT

An interior cleaning device for a machine tool includes a pipe arranged inside a cover covering at least a periphery of a machining section of the machine tool, and a pump for supplying liquid into the pipe, the interior cleaning device being for ejecting liquid from the pipe and cleaning accumulated substances accumulated inside the cover, wherein the pipe includes a first pipe provided with a first ejection section for ejecting liquid or air into the cover, and a second pipe installed inside the first pipe and that is provided with a second ejection section at a part facing other than downward in a vertical direction.

3 Claims, 5 Drawing Sheets

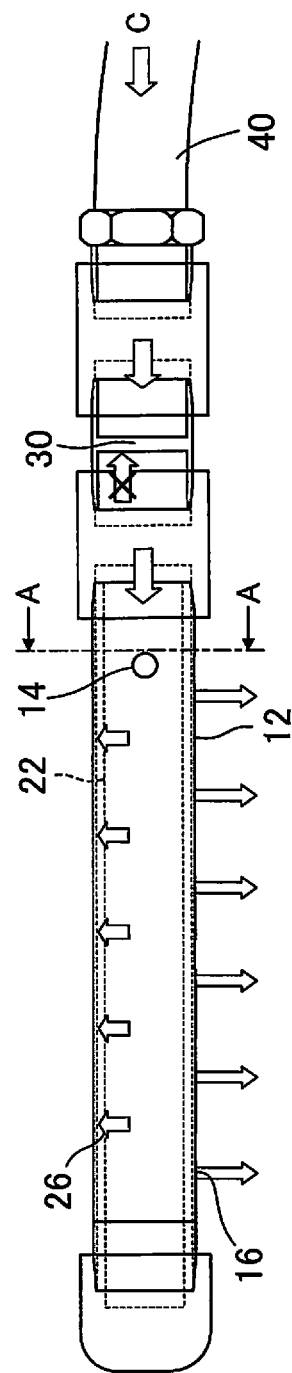

CROSS-SECTION
A-A

CROSS-SECTION
A-A

INTERIOR CLEANING DEVICE FOR MACHINE TOOL, AND CLEANING PIPE USED BY INTERIOR CLEANING DEVICE FOR MACHINE TOOL

RELATED APPLICATIONS

The present application claims priority of Japanese Application Number 2014-101871, filed May 16, 2014, the disclosure of which is hereby incorporated by reference herein in its entirety.

BACKGROUND OF THE INVENTION

1. Field of the Invention

The present invention relates to an interior cleaning device for a machine tool, and more particularly, to an interior cleaning device for a machine tool for preventing dripping of coolant.

2. Description of the Related Art

A machine tool has a machining space covered by a cover to prevent scattering of chips and coolant to the periphery. Chips produced by machining by the machine tool may sometimes be accumulated inside this space covered by a cover (hereinafter referred to as "interior"). Then, when the accumulated chips enter a mechanical section of the machine tool, this may lead to breakdown of the mechanical section of the machine tool. Accordingly, to prevent breakdown of the mechanical section of the machine tool caused by entering of chips, the chips accumulated in the interior have to be cleaned.

To clean the interior, cleaning is sometimes performed by using a device (hereinafter referred to as "interior cleaning device") that sends coolant into the interior by a pump and discharges the chips to the outside together with the coolant.

FIG. 4 is a schematic diagram showing an interior cleaning device. Chips 60 produced by a machining section 1 of a machine tool are accumulated inside a cover 50, and an interior cleaning device 10 is arranged inside the cover 50. This interior cleaning device 10 has a pump, not shown, joined to the interior by a hose 40 or the like, and a pipe 112 is installed in the interior, and holes 116 are opened along the pipe and at the tip end thereof. Coolant C is sent into the hose 40 and the pipe 112 by the pump, not shown, and the coolant C is ejected from the holes 116, and the chips accumulated in the interior are discharged to the outside together with the coolant C. It is also possible to attach nozzles, not shown in the figure, to the holes 116 and to eject the coolant C from the tip ends of the nozzles, instead of ejecting the coolant C directly from the holes 116.

Japanese Patent Laid-Open No. 2008-80464 discloses a liquid curtain generation device for supplying a liquid and generating a curtain film by the flow of the liquid, where the device generates the liquid curtain by ejecting the liquid from a slit formed to a peripheral wall of a tube.

Japanese Patent Laid-Open No. 2003-25180 discloses a technique for prevent scattering of chips produced at the time of machining a workpiece from a curtain liquid coolant film by discharging liquid coolant from a curtain nozzle to the workpiece fixed to a jig.

The techniques disclosed in Japanese Patent Laid-Open No. 2008-80464 and Japanese Patent Laid-Open No. 2003-25180 are for generating a so-called liquid curtain for preventing chips produced by a machine tool from being scattered to the outside, and are different from cleaning of the interior by discharge of chips accumulated inside a cover where a machine tool is installed to the outside. Also, the liquid curtain generation device disclosed in Japanese Patent Laid-Open No. 2008-80464 has a problem described later, because the slit formed to the pipe is formed directly underneath the pipe.

With the interior cleaning device shown in FIG. 4, the coolant C may drip from the holes 116 or the tip ends of the nozzles after the pump is stopped to stop ejection of the coolant C. This is because the coolant C collected inside the pipe 112 drips from the holes 116 or the nozzles due to the gravity after the pump is stopped. To prevent this dripping, the position of opening the holes 116 may be made such that dripping does not occur, but in this case, the direction of ejecting the coolant may be restricted, and chips may not be sufficiently discharged outside. As another method, in the case of attaching a nozzle to a hole, it is possible to attach, in an opposite direction from the gravity, a flexible pipe having a nozzle attached at the tip end and to bend the pipe, but since a flexible pipe of more than necessary length has to be prepared, this increases the cost and also may require a space for installation.

SUMMARY OF THE INVENTION

Accordingly, in view of the above problems, the present invention aims to provide an interior cleaning device for a machine tool which is capable of preventing dripping of coolant.

An interior cleaning device for a machine tool according to the present invention includes a pipe arranged inside a cover covering at least a periphery of a machining section of the machine tool, and a pump for supplying liquid into the pipe, the interior cleaning device being for ejecting liquid from the pipe and cleaning accumulated substances accumulated inside the cover, wherein the pipe includes a first pipe provided with a first ejection section for ejecting liquid or air into the cover, and a second pipe installed inside the first pipe and that is provided with a second ejection section at a part facing other than downward in a vertical direction.

Since the pipe has a double structure including the first pipe and the second pipe, and the ejection section of the second pipe provided on the inside is provided at a part facing other than downward in the vertical direction, the liquid collected inside may be prevented from dripping. Also, according to the double structure, the volume of the gap between the pipe on the inside and the pipe on the outside is small compared to the volume of the entire inside when there is only one pipe, and most of the supplied liquid is collected inside the pipe on the inside, and thus the amount of liquid that drips from the pipe on the outside may be reduced.

A hole for supplying air may be provided to the first pipe, and air may be supplied between the first pipe and the second pipe.

By providing the hole for supplying air to the first pipe, and sending air from the hole with great force after stopping the pump, it becomes possible to blow off the liquid collected in the gap between the pipe on the outside and the pipe on the inside, and to prevent dripping of liquid from the pipe on the outside.

A check valve for preventing liquid or air from flowing into the pump from the second pipe may be provided.

By providing the check valve, it becomes possible to prevent liquid or air from flowing into the pump from the second pipe.

A cleaning pipe used by an interior cleaning device for a machine tool according to the present invention is for carrying out cleaning by ejecting liquid, wherein the cleaning pipe includes a first pipe that is provided with a first ejection section for ejecting liquid or air, and a second pipe installed inside the first pipe and provided with a second ejection section at a part facing, when installed, other than downward in a vertical direction.

With the structures described above, the present invention is able to provide an interior cleaning device for a machine tool capable of preventing dripping of coolant, and a cleaning pipe that is used by the interior cleaning device.

BRIEF DESCRIPTION OF THE DRAWINGS

The above-described and other objects and features of the present invention will be made clear from the description of the embodiment given below with reference to the appended drawings. Of these drawings:

FIGS. 2A and 2B are diagrams showing the states of supplying coolant at the time of cleaning an interior;

DETAILED DESCRIPTION OF THE PREFERRED EMBODIMENTS

Figure 1:
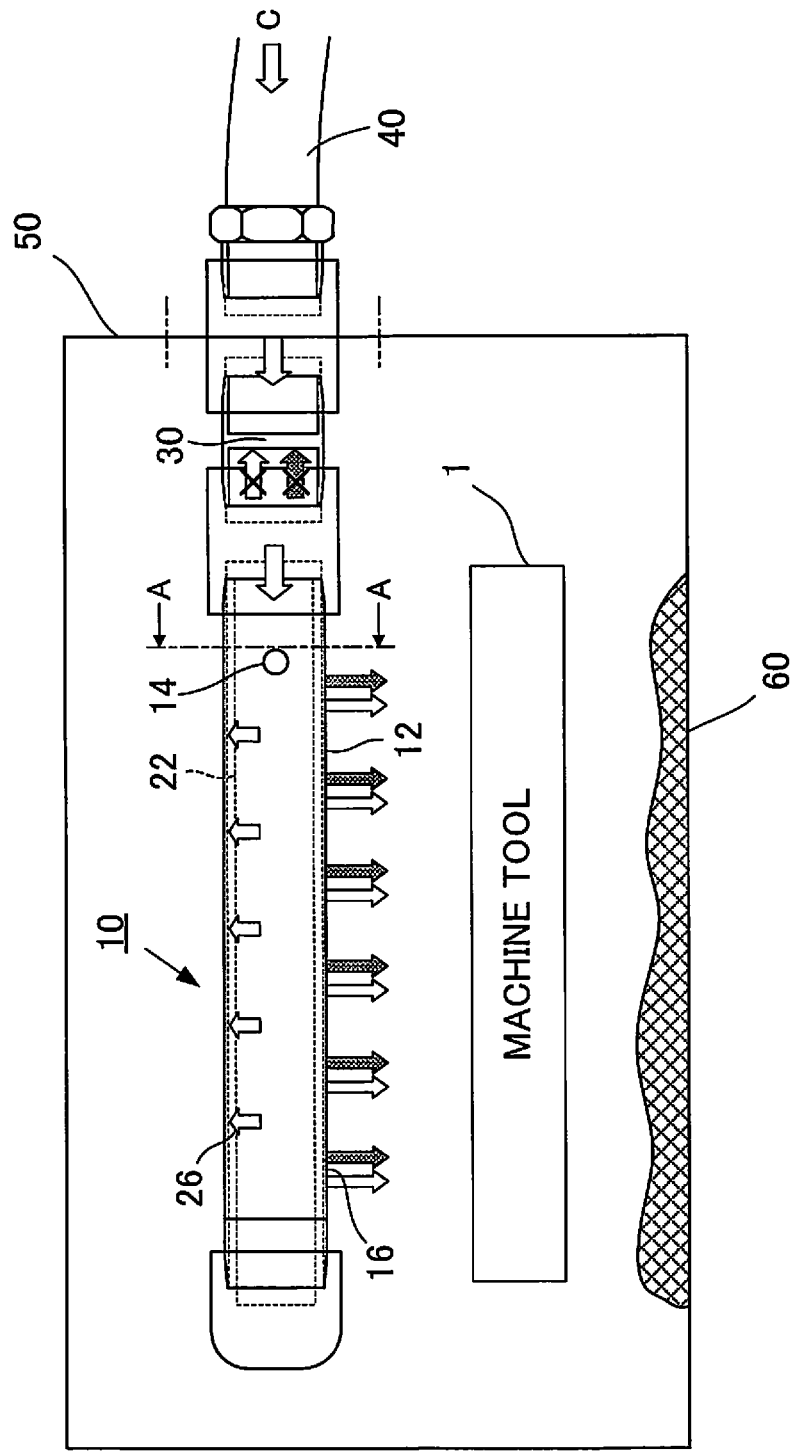
FIG. 1 is a schematic diagram showing an interior cleaning device for a machine tool according to an embodiment of the present invention.

FIG. 1 is a schematic diagram showing an interior cleaning device for a machine tool according to a present embodiment. An interior cleaning device 10 of the present embodiment is installed inside a cover 50 inside which a machining section 1 of a machine tool is installed, and chips 60 produced by machining by the machine tool are accumulated inside the cover 50. Additionally, it is sufficient if the cover 50 is structured to cover at least the periphery of the machining section of the machine tool.

The reference numeral 40 refers to a hose, and coolant C is supplied thereto from an outside pump, not shown in the figure. The coolant C which has been supplied is supplied into the interior cleaning device 10 via a check valve 30. The check valve 30 is provided connected to a second pipe 22, described below, on the inside, and is structured such that the coolant C or air described below does not flow backward in the direction of the hose 40.

The interior cleaning device 10 has a double structure with a first pipe 12 on the outside and the second pipe 22 on the inside. Each pipe is made of a steel pipe, but it may also be formed of other materials such as plastic, resin and the like. A plurality of first pipe holes 16 are provided to the first pipe 12 on the outside. The first pipe holes 16 are provided in a direction where chips are easily collected by taking into account discharge of the chips inside the cover 50. Additionally, in the present embodiment, the first pipe holes 16 are formed, but cutouts may be formed or nozzles may be connected instead of the holes. Also, an air supply hole 14 described below is also provided separately from the plurality of first pipe holes 16. A plurality of second pipe holes 26 are provided on the upside of the second pipe 22 on the inside. In the present embodiment, the second pipe holes 26 are provided on the upside of the second pipe 22 in the vertical direction, but they may be provided at any other parts other than on the downside in the vertical direction. Also, cutouts may be provided instead of the holes.

Figure 2B:
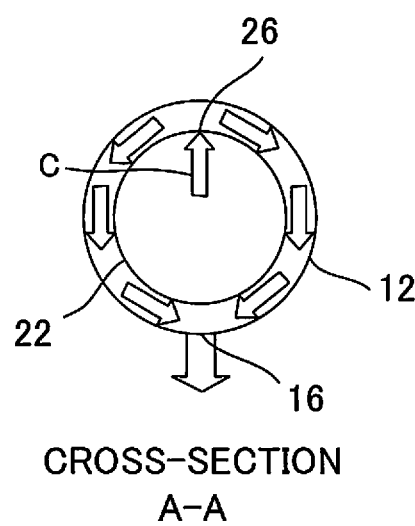

Next, an operation of the interior cleaning device 10 will be described. FIGS. 2A and 2B are diagrams showing the states of supplying coolant at the time of cleaning an interior, and FIG. 2A is a schematic view from the side of the interior cleaning device 10, and FIG. 2B is a cross-sectional diagram of A-A in FIG. 2A. Additionally, in FIGS. 2A and 2B, the cover 50 of the machine tool around the interior cleaning device 10 and the chips 60 accumulated inside the cover 50 are omitted from the drawings.

The coolant C which is supplied from the pump, not shown, is supplied into the second pipe 22 on the inside via the hose 40 and the check valve 30. The coolant C which is supplied into the second pipe 22 is supplied into the space between the first pipe 12 and the second pipe 22 through the second pipe holes 26 as shown by the arrows in FIGS. 2A and 2B. The coolant C which is supplied into the space between the first pipe 12 and the second pipe 22 is ejected from the first pipe holes 16 provided to the first pipe 12, and the chips 60 accumulated in the interior are discharged to the outside by the ejected coolant C. Here, since the check valve 30 is provided, when discharge of the chips 60 from the inside of the second pipe 22 is ended and the pump is stopped to stop supply of the coolant C, the coolant C does not flow back to the pump from inside the second pipe 22. At this time, the coolant C may remain inside the second pipe 22, but in the present embodiment, the second pipe holes 26 provided to the second pipe 22 are provided in an opposite direction from the gravity which is other than downward in the vertical direction, and thus the coolant C collected inside does not drip to the outside.

Also, since the gap between the first pipe 12 and the second pipe 22 is narrow, the space formed inside the gap between the pipes is narrow. Accordingly, the amount of coolant C that is collected in the gap between the first pipe 12 and the second pipe 22 is extremely small, and the amount of coolant C that drips from the first pipe 12 may be made small.

Figure 3B:
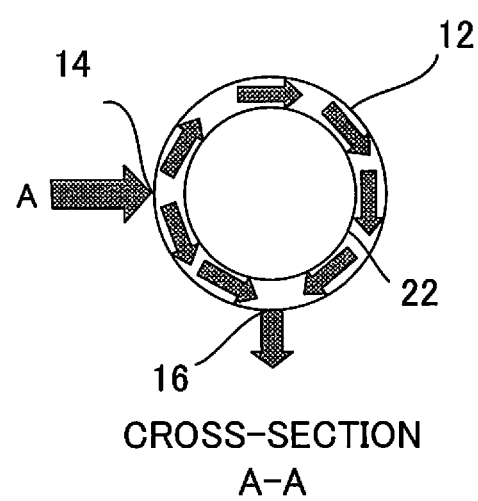
FIGS. 3A and 3B are diagrams showing the states of supplying air at the time of drying the inside of a pipe.
Figure 3A:
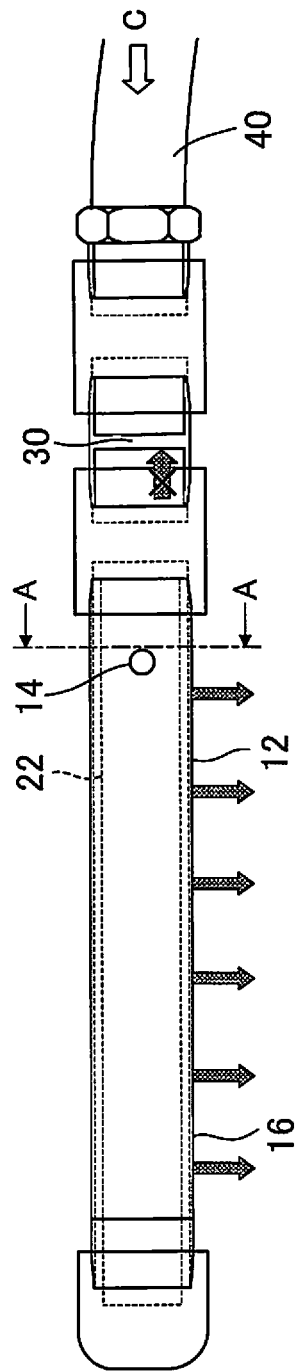
Figure 4:
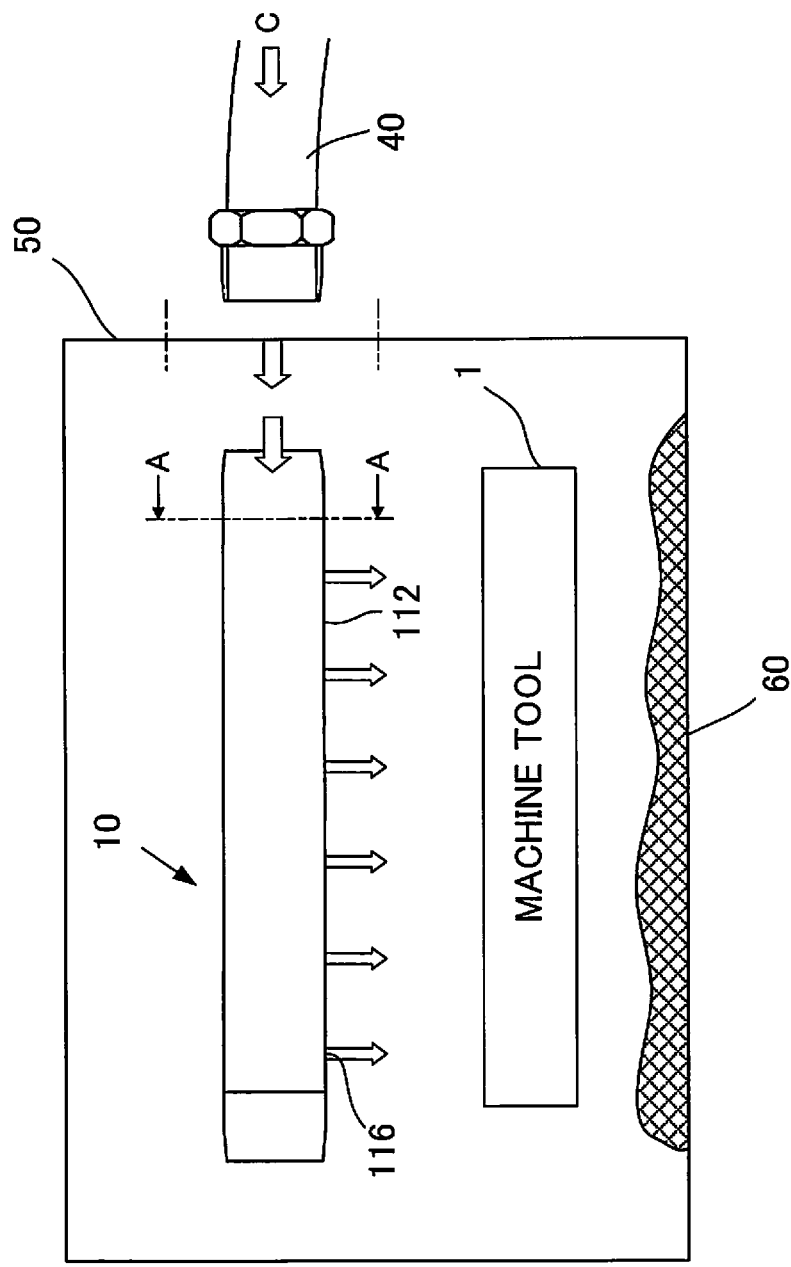
FIG. 4 is a schematic diagram showing a conventional interior cleaning device for a machine tool.

FIGS. 3A and 3B are diagrams showing the states of supplying air at the time of drying the inside of the pipe, and FIG. 3A is a schematic view from the side of the interior cleaning device 10, and FIG. 3B is a cross-sectional diagram of A-A in FIG. 3A. Additionally, also in FIGS. 3A and 3B, the cover 50 of the machine tool around the interior cleaning device 10 and the chips 60 accumulated inside the cover 50 are omitted from the drawings.

Supply of air is performed after the pump is stopped and supply of the coolant C is stopped, and the air is supplied through the air supply hole 14 provided to the first pipe 12. As shown in FIG. 3B, the air that is supplied from the air supply hole 14 passes through the space between the first pipe 12 and the second pipe 22, and is ejected from the first pipe holes 16 provided to the first pipe 12. Here, the coolant C that is collected in the space between the first pipe 12 and the second pipe 22 is ejected from the first pipe holes 16 together with the air, and dripping of the coolant C from the first pipe holes 16 is prevented. At this time, since the check valve 30 is provided to the second pipe 22, even if the air enters the second pipe 22, it does not flow back in the direction of the pump.

In the present embodiment, at the time of cleaning the interior of the machine tool, cleaning is performed using coolant, but coolant does not necessarily have to be used, and it is possible to carry out cleaning using a liquid other than coolant to clean the interior.

The invention claimed is:
1. An interior cleaning device for a machine tool, said interior cleaning device comprising:
 a pipe arranged inside a cover covering at least a periphery of a machining section of the machine tool, and a pump for supplying liquid into the pipe, wherein the pipe includes:

a first pipe provided with a first ejection section for ejecting the liquid or air into the cover;

a second pipe installed inside the first pipe and provided with a second ejection section at a part facing other than downward in a vertical direction, and wherein the interior cleaning device is configured to eject the liquid, which is supplied by the pump into the second pipe, through the second ejection section and the first ejection section to clean accumulated substances accumulated inside the cover, and the first pipe further includes a hole for supplying air between the first pipe and the second pipe.

2. The interior cleaning device according to claim 1, comprising:

a check valve configured to prevent the liquid or air from flowing into the pump from the second pipe.

3. A cleaning pipe of an interior cleaning device for a machine tool, the cleaning pipe being configured to carry out cleaning by ejecting liquid, the cleaning pipe comprising:

a first pipe provided with a first ejection section for ejecting liquid or air; and a second pipe installed inside the first pipe and provided with a second ejection section at a part facing, when installed, other than downward in a vertical direction, and wherein the cleaning pipe is configured to eject the liquid, which is supplied into the second pipe, through the second ejection section and the first ejection section to carry out the cleaning, and the first pipe further includes a hole for supplying air between the first pipe and the second pipe.

* * * * *